United States Patent [19]
Billeter

[11] 4,115,026
[45] Sep. 19, 1978

[54] LEAD SCREW TAPPING ARRANGEMENT FOR USE WITH SELF-OPENING DIE HEADS AND COLLAPSIBLE TAPS

[75] Inventor: Henry R. Billeter, Marco Island, Fla.

[73] Assignee: Sloan Valve Company, Franklin Park, Ill.

[21] Appl. No.: 702,946

[22] Filed: Jul. 6, 1976

Related U.S. Application Data

[63] Continuation-in-part of Ser. No. 602,188, Aug. 6, 1975, abandoned.

[51] Int. Cl.² ............................................... B23G 1/18
[52] U.S. Cl. ..................................... 408/10; 408/132; 408/140
[58] Field of Search ............... 10/139 R; 408/12, 129, 408/130, 132, 134, 140, 10; 74/89.15

[56] References Cited
U.S. PATENT DOCUMENTS

| | | | |
|---|---|---|---|
| 2,994,305 | 8/1961 | Bruet | 10/139 R |
| 3,083,592 | 4/1963 | Carlstedt | 408/130 X |
| 3,178,740 | 4/1965 | Dorak | 408/134 |
| 3,690,782 | 9/1972 | Petroff | 408/132 |

*Primary Examiner*—John Sipos
*Attorney, Agent, or Firm*—Kinzer, Plyer, Dorn & McEachran

[57] ABSTRACT

Means for controlling the advance of a thread forming member include a unidirectionally driven constant speed spindle, with the spindle mounting a thread forming member. A lead screw and a nut threadedly mounted thereon have a thread in which the helix angle is sufficiently high that the nut is freely rotatable relative to the lead screw in response to axial movement of the lead screw. The lead screw or the nut is attached to the spindle. There are means for controlling rotation of the other of these two members independently of the member attached to the spindle and during unidirectional constant speed rotation of the spindle to thereby control axial movement of the spindle.

16 Claims, 5 Drawing Figures

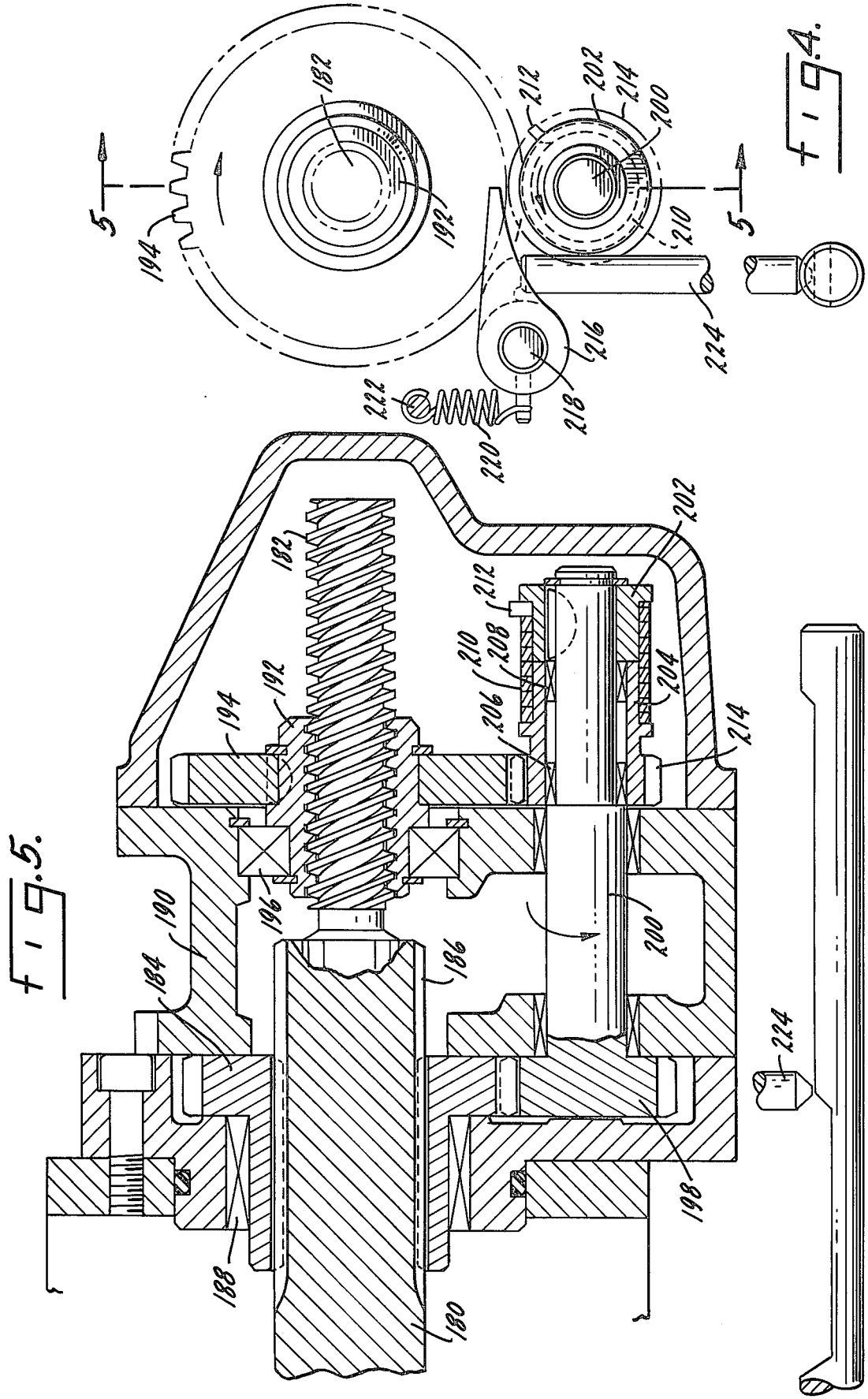

LEAD SCREW TAPPING ARRANGEMENT FOR USE WITH SELF-OPENING DIE HEADS AND COLLAPSIBLE TAPS

This application is a continuation-in-part of my co-pending application Ser. No. 602,188, filed Aug. 6, 1975 now abandoned.

SUMMARY OF THE INVENTION

The present invention relates to a lead screw tapping device and in particular to means for controlling axial advancement of the spindle and its thread forming member.

A primary purpose of the invention is a lead screw tapping arrangement of the type described which permits rapid advancement of the thread forming member up to the area to be threaded and then controlled advancement through the thread forming portion of lead screw movement.

Another purpose is a lead screw tapping arrangement of the type described in which a nut is threadedly mounted on the lead screw, with controlled rotation of the nut, independent of the lead screw, controlling lead screw advancement.

Another purpose is a lead screw tapping arrangement of the type described in which the nut is urged toward frictional engagement with a clutch member whose rotational speed is controlled.

Another purpose is a lead screw tapping arrangement providing an accurately controlled means for positively stopping lead screw advance.

Another purpose is a lead screw tapping arrangement in which the spindle rotates continuously in one direction during advance and return.

Another purpose is a threading arrangement of the type described in which the threading instrument is removed from the work without stopping it or reversing the direction of spindle rotation.

Another purpose is a means for controlling the advance of a thread forming member using a unidirectionally driven constant speed spindle mounting a thread forming member and utilizing a lead screw and nut threadedly mounted thereon in which the lead screw and nut thread has a helix angle sufficiently high that the nut is freely rotatable relative to the lead screw in response to axial movement of the lead screw.

Other purposes will appear in the ensuing specification, drawing and claims.

BRIEF DESCRIPTION OF THE DRAWINGS

The invention is illustrated diagrammatically in the following drawings wherein:

FIG. 4 is an end view of a further modified form of the invention, FIG. 5 is a section along plane 5—5 of FIG. 4.

DESCRIPTION OF THE PREFERRED EMBODIMENT

Figure 1:
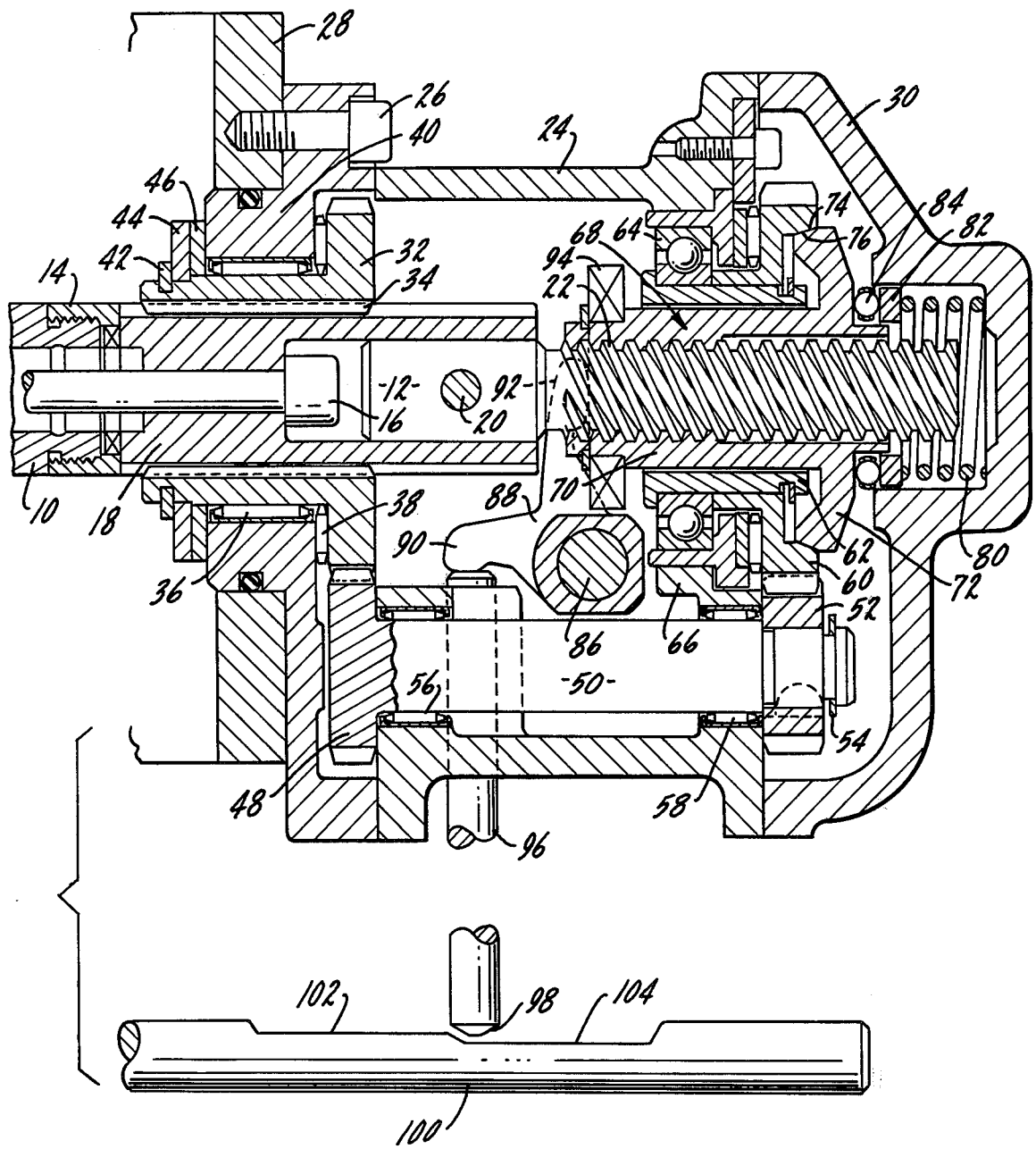
FIG. 1 is a section through one form of control mechanism for a spindle driving a tapping device.

The present invention has application in the field of thread forming members, either taps or dies, in which the die head may be of the self-opening type and the tap may be of the collapsible type. Such thread forming members are conventionally used on large machine tools with the work piece to be threaded being indexed into position. Customarily such machine tools will perform a number of different operations on the work piece, with one station performing the threading operation. It is important in such an operation to perform the thread forming step as rapidly as possible. To that end, the present invention provides rapid advancement of the thread forming member up to the point where it enters the work piece, controlled advancement through the thread forming operation, and then rapid removal. In prior thread forming arrangements, the thread forming member advanced to a working position at the same rate of speed as it would during the thread forming operation, which necessitated a greater overall time period than was necessary. In another type of thread forming operation the spindle was rotated at one speed for tapping and at a second speed for movement toward and away from the tapping position. This involved repetitive reversal of motor direction and changing of motor speeds. The present invention provides a spindle, rotating in one direction at a constant speed. The thread forming member is hydraulically advanced toward a position where it can enter the work piece, is then hydraulically advanced through the thread forming operation, but at a controlled rate, and is then hydraulically withdrawn from the work piece at a rapid rate. Although I have described a hydraulic arrangement, a pneumatic system is also satisfactory.

An essential aspect of the invention is the relationship between the lead screw and the nut threadedly mounted thereon. In some forms of the invention the lead screw will be attached to the spindle, whereas, in other forms the nut will be attached to the spindle. Either form is satisfactory. What is important is the helix angle of the thread formed on the lead screw and nut. The helix angle must be sufficiently large such that the nut can freely spin upon the screw when an axial force is applied to the screw. The helix angle must be such that if you axially restrain and rotate the nut the lead screw will axially move relative to the nut. There are also other considerations. The lead of the screw thread must be greater than the lead of the threading device whether it be a tap or die. The thread lead should be equal or approximately so to the pitch diameter of the lead screw. The minimum helix angle for the lead screw thread is approximately 15°, with the maximum helix angle being about 45°. The most effective helix angle for the lead screw thread is between 15°-20° and 17.6° has been found to be a satisfactory helix angle.

In all forms of the invention, the spindle will rotate in one direction at a constant speed. Either the lead screw or the nut will be physically attached or fixed to the spindle with the other element being arranged for independent rotational control. Assuming for purposes of description that the lead screw is attached to the spindle, the nut is permitted to freely rotate or idle upon the lead screw as the lead screw moves with the spindle during initial advancement of the thread forming tool. During the actual threading operation, the rotational speed of the nut is accurately controlled, which in turn controls the axial advance of the lead screw and thus the axial advance of the spindle and thread forming device.

In the drawings, the lead screw arrangement is shown as being adaptable for attachment to a conventional thread forming machine manufactured by Diedesheim of West Germany. A spindle 10, which will be driven at a constant speed by portions of the machine not shown, and which will mount the thread forming member, either a collapsible tap or a self-opening die head is attached to a lead screw 12 through a coupling arrangement including a collar 14, a cap screw 16, a sleeve 18 and a pin 20. The particular means of attachment is not important. In many applications, the lead screw will in fact be formed directly on the spindle itself. In any event, the lead screw 12 will be rotated at a constant speed by spindle 10. The outer end of lead screw 12 has a multistart thread 22 formed on the surface thereof.

A housing 24 is attached by cap screws or the like 26 to a gear box 28 which is a part of the overall machine tool. The housing 24 has a removable end plate 30 forming a part thereof.

A gear 32 is splined, as at 34, to the surface of sleeve 18 and thus to spindle 10. Gear 32 will rotate at spindle speed. A needle bearing 36 and a thrust bearing 38 are positioned between gear 32 and a portion 40 of housing 24. A snap ring 42, a large ring 44 and a thrust bearing 46 serve to mount gear 32 relative to face plate 28 and housing portion 40.

Gear 32 is in mesh with a gear portion 48 of shaft 50 which rotates within housing 24 beneath or radially offset from lead screw 12. At the opposite end of shaft 50 is a change gear 52 which is held in position by a snap ring 54. Bearings 56 and 58 provide for rotation of shaft 50, as driven by spindle 10.

In mesh with gear 52 is a geared clutch member 60 which rotates about and is concentric with lead screw 12. Clutch member 60 is fixed to a sleeve 62 which in turn is rotatably positioned by a bearing 64 relative to a housing portion 66.

Concentric with lead screw 12 and threadedly mounted thereon is a nut member 68 having an axially extending portion 70 and a radially extending portion 72. Portion 72 has a friction surface 74 positioned to be in frictional engagement with a mating surface 76 on clutch member 60.

A coil spring 80 is positioned concentric with lead screw 12 and, through a bearing having a washer 82 and a cage 84, exerts axial pressure on nut 62, tending to urge friction surfaces 74 and 76 into contact.

A shaft 86 is journaled in housing 24 and mounts a throw-out yoke 88 having an arm 90 extending in a direction generally parallel with lead screw 12 and a second arm 92 extending generally perpendicular to lead screw 12 and positioned to bear against a thrust bearing 94 mounted on a hub 70 of nut 68. Arm 90 in turn rests upon a cam follower 96 which extends outwardly from housing 24 and has a surface 98 on the lower end thereof. Cam follower 96 will have its vertical position controlled by a cam 100 which is fixed to the machine tool and will be moved in conjunction with spindle 10. Cam 100 has a first surface 102 and a second surface 104. Surface 102 will function to control the approach of the lead screw prior to the actual tapping operation, whereas, surface 104 controls the rate of advancement of the lead screw during the tapping operation, as will be described.

It should be understood that spindle 10 will mount either a self-opening die or a collapsible tap or a similar thread forming tool. Spindle 10 will be driven at a constant speed by a suitable electric motor. The spindle will be axially advanced toward the work by suitable means, preferably hydraulic. As the machine advances, cam 100 with be advanced with the spindle.

During the period that spindle 10 is being advanced and cam follower 96 bears against cam surface 102, throw-out yoke 88 will be providing an axially directed force, through thrust bearing 94, upon nut 68, against the action of spring 80. This axially directed force will prevent frictional engagement between surfaces 74 and 76 and thus nut 68 will be free to turn in its axially fixed position relative to lead screw 12. The lead screw will be advanced by the machine tool and as it advances, nut 68 will rotate relative to it. During this portion of the advancement, there will be no thread forming operation and the advancement of the lead screw and spindle will be rapid.

When cam 100 reaches the point where cam follower 96 is above cam surface 104, the follower will drop down causing throwout yoke 88 to pivot about shaft 86 and thus eliminate the axial thrust applied to nut 68. Spring 80 will apply an axial thrust in the opposite direction urging frictional engagement between surfaces 74 and 76. At this point, and during the remainder of the axial movement of lead screw 12 and spindle 10, axial advancement of the lead screw will be controlled by the rotational speed of nut 68 which in turn is controlled by gear 60. Rotation of gear 60 is provided, through gears 52 and 48, and gear 32 by spindle rotation. However, the ratio between change gear 52 and change gear 60 will control the rotational speed of nut 68.

As an example, to tap a thread of 16 threads per inch, with a screw of one-inch lead and a gear ratio of 3.2 to 3.0, nut speed would be 900 rpm and spindle speed would be 960 rpm. The advancement of the spindle under these speeds would be appropriate to tap 16 threads per inch. It is the speed of nut 68, as it turns, which will control the axial advancement of the lead screw and thus the thread forming member. Since nut 68 is threadedly mounted on lead screw 12, the lead screw cannot advance at any greater speed than that permitted by rotation of nut 68. Prior to the time of frictional engagement between surfaces 74 and 76, nut 68 was free to rotate at a speed consistent with rapid advancement of the lead screw. This is not the case when there is frictional engagement between the described surfaces as provided by spring 80. Thus, the rate of advancement during the thread forming operation is controlled by the rotational speed of nut 68. In this connection, nut 68 can only retard advance of the spindle.

In order to cut threads of different pitch, gear 52 and gear 60 are changeable. Cover 30 is removed, permitting access to the gear assembly, which can then be removed in a convenience manner to provide gears appropriate for a particular tapping operation.

Figure 2:
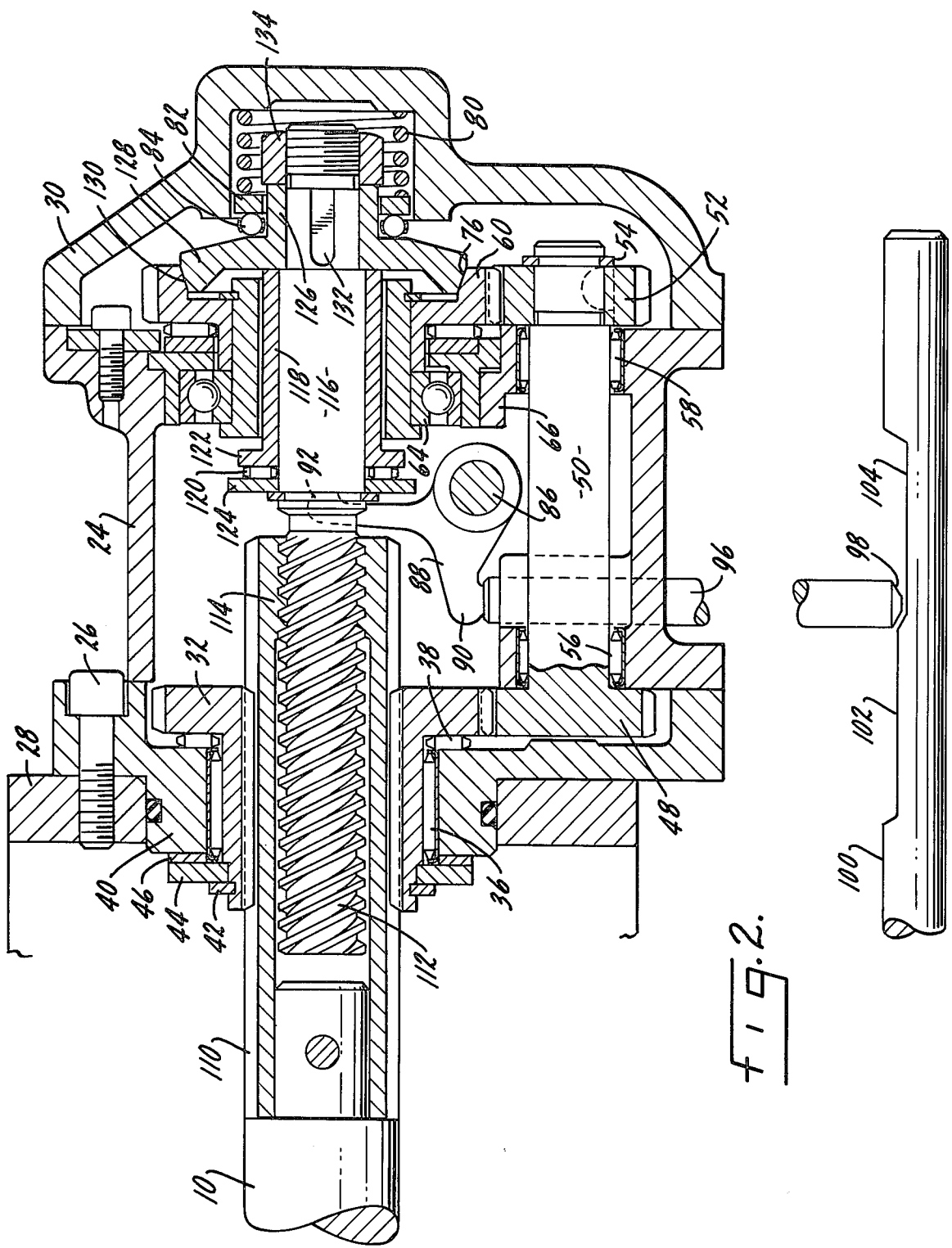
FIG. 2 is a section, similar to FIG. 1, showing a further form of the invention.

The structure of FIG. 2 is quite similar to that of FIG. 1, except that the nut is physically attached to the spindle and the lead screw is arranged for independent rotation. Like parts have been given the same numbers. A nut 110 is suitably pinned to spindle 10 and drives gear 32. A lead screw 112 threadedly engaged with nut 110, as at 114, has a shaft 116 mounting a sleeve 118. A bearing 120 is positioned between a radially-extending portion 122 of sleeve 118 and a collar 124 fixed on shaft 116.

A collar 126 having a radially-extending portion 128 with a friction surface 130 is keyed, as at 132, to shaft 116. A nut 134 is threaded onto the end of shaft 116 and holds collar 126 in position fast against sleeve 118. Friction surface 130 of collar 126 is positioned to be in frictional engagement with mating friction surface 76 on geared clutch member 60.

The device of FIG. 2 operates substantially the same as the device of FIG. 1. During the rapid portion of spindle advance, the spindle and nut will freely rotate relative to the lead screw. There will be no frictional engagement between friction surface 130 and friction surface 76. As soon as cam follower 96 is above cam surface 104, the follower will drop down causing throw-out yoke 88 to pivot about shaft 86 and thus eliminate the axial thrust applied to the lead screw. Spring 80 will then apply an axial thrust in the opposite direction urging frictional engagement between surfaces 76 and 130. At this point, and during the remainder of the axial movement of the spindle and nut 110, axial advancement of the spindle will be controlled by the rotational speed of lead screw 112, which in turn is controlled by gear 60, as described above.

Figure 3:
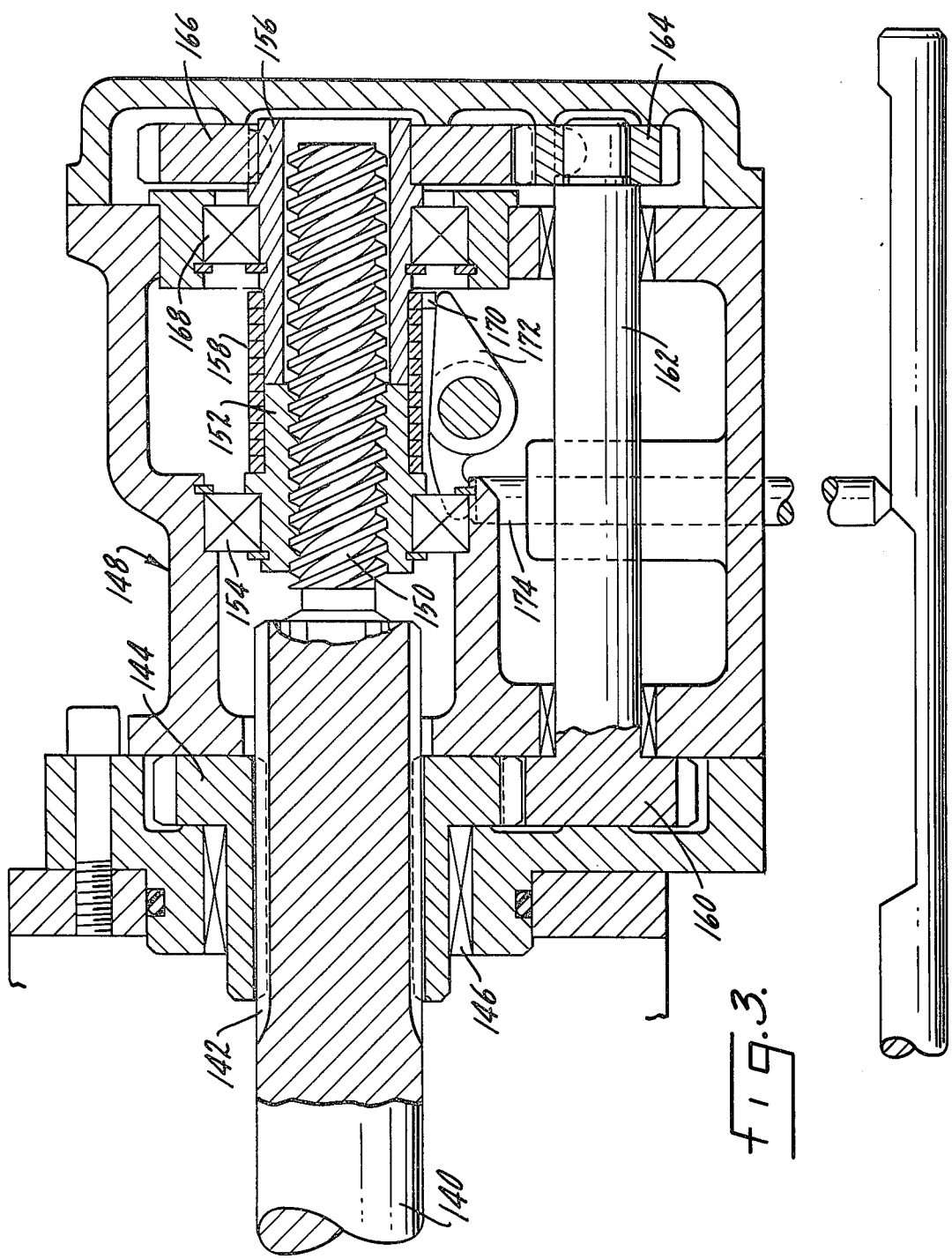
FIG. 3 is a section, similar to FIGS. 1 and 2, showing yet a further form of the invention.

In the structure of FIG. 3, a spindle 140 has a spline section 142 which mounts a gear 144. A bearing 146 encloses a portion of gear 144 and provides for rotational mounting of the gear within a housing indicated generally at 148. Integral with the spindle 140 is a lead screw 150 threadedly mounting a nut 152. A bearing 154 provides for rotational movement of nut 152 relative to housing 148.

A rotatable sleeve 156 is concentrically positioned about the end of lead screw 150 and has an end surface facing a mating end surface of nut 152. A coil spring which forms a spring clutch is indicated at 158 and has its coils wrapped about both nut 152 and sleeve 156.

In the manner described before, gear 144 is in mesh with gear 160 mounted on a shaft 162 having a change gear 164 mounted on its opposite end. Gear 164 in turn is in mesh with a gear 166 concentric with the lead screw and sleeve 156 and fixed to the sleeve. A bearing 168 mounts sleeve 156 within housing 148 for rotation relative to the housing. In the manner described before, sleeve 156 will be driven, from the spindle, and will be available to cause rotation of nut 152 when spring clutch 158 is activated. Spring clutch 158 has a tab 170 positioned adjacent throw-out yoke 172, the position of which is controlled by cam follower 174.

In the operation of the device of FIG. 3, during the period that the spindle and the threading device are being rapidly advanced to a working position, throw-out yoke 172 is in engagement with tab 170 of spring clutch 158, thus preventing the spring from rotating. Nut 152 does not move in an axial direction but freely rotates relative to the lead screw. Sleeve 156 is being driven through the described gearing arrangement and is idling at a speed slightly less than that of the nut. When the spindle has reached working position, cam follower 174 will cause movement of throwout yoke 172 to the position shown in FIG. 3, releasing spring clutch 158. Spring clutch 158 then effectively locks nut 152 and sleeve 156 together, whereby rotation of the nut is controlled through the described gearing arrangement with the result that rotation of the nut now controls advance of the spindle and threading device in the manner described above.

In the structure of FIG. 3, the lead screw is a part of or attached to the spindle. It should be understood, as in the manner of FIG. 2, that this arrangement may be reversed and the nut may be fixed to the spindle.

In the structure of FIGS. 4 and 5, spindle 180 has a lead screw portion 182 integral therewith. A gear 184 is in mesh with a gear portion 186 of spindle 180 and a bearing 188 mounts gear 184 for rotation relative to housing 190. A nut 192 is threadedly mounted on lead screw portion 182 and has a gear 194 fixed thereto. Bearing 196 is positioned between nut 192 and housing 190.

A gear 198 is in mesh with gear 184 and in turn is formed on one end of a shaft 200, the other end of which carries collar 202. A sleeve 204 is rotatably positioned on shaft 200 by bearings 206 and 208 and is positioned adjacent collar 202. A spring clutch 210 is wound about the adjacent peripheries of collar 202 and sleeve 204 and has a tab 212 extending outwardly from one end. Sleeve 204 has a gear portion 214 which is in mesh with gear 194 fixed to nut 192. In essence, the clutch structure of FIG. 5 has been moved from a location concentric with the lead screw to one in which it is parallel to and spaced from the lead screw.

A throw-out yoke 216 is mounted on a shaft 218 and urged by spring 220 attached to a fixed support 222 toward tab 212 on spring clutch 210. Cam follower 224 holds the yoke in the position shown during a portion of spindle movement, as described above.

The structure of FIGS. 4 and 5 operates in the same manner as that described in connection with FIG. 3, with the primary difference being that the spring clutch is not concentric with the lead screw, but is spaced from it. The clutching action takes place between collar 202 and sleeve 204 which mechanically drives nut 192 through gear 194.

The invention has wide application as a lead screw tapping arrangement for various thread forming devices. It should not be limited to use on any particular machine.

The pitch of the lead screw provides for motion to be transmitted from the lead screw to the nut or from the nut to the lead screw, thus forming a reversible force and motion transmitting combination.

Although the structure has been described in connection with a threading means, by disengaging the described gears the mechanism can be adapted for use in a drilling or boring operation.

Whereas the preferred form of the invention has been shown and described herein, it should be realized that there may be many modifications, substitutions and alterations thereto.

The embodiments of the invention in which an exclusive property or privilege is claimed are defined as follows:

1. Means for controlling the advance of a thread forming member including a unidirectionally constant speed spindle, a thread forming member on said spindle, a lead screw and a nut threadedly mounted thereon, said lead screw and nut thread having a helix angle such that the nut is freely rotatable relative thereto in response to axial movement of the lead screw, one of the nut and lead screw being attached to the spindle, and means for independently controlling rotation of the other of said nut and lead screw through a clutch member which member is driven by the unidirectional constant rotation of said spindle to thereby control axial movement of said spindle.

2. The structure of claim 1 further characterized in that the minimum helix angle of the nut and lead screw thread is approximately 15°.

3. The structure of claim 1 further characterized in that the maximum helix angle of the nut and lead screw thread is approximately 45°.

4. The structure of claim 1 further characterized in that said lead screw is attached to said spindle, said clutch member being positioned for frictional engagement with said nut, and means for rotating said clutch member.

5. The structure of claim 4 further characterized in that said clutch member is driven by said lead screw.

6. The structure of claim 5 further characterized by and including speed control means connected between said clutch member and said lead screw for controlling the rotational speed of said clutch member.

7. The structure of claim 6 further characterized by and including spring means axially urging said nut into frictional engagement with said clutch member.

8. The structure of claim 4 further characterized by and including means for preventing frictional engagement between said clutch member and nut for a portion of the axial movement of said lead screw.

9. The structure of claim 8 further characterized in that said means for preventing frictional engagement include a thrust member concentric with said nut and mounted thereon and means for applying axially-directed pressure to said thrust member.

10. The structure of claim 9 further characterized in that said means for applying axially directed pressure to said thrust member includes a throw-out lever pivotally mounted adjacent said lead screw, with a portion of said throw-out lever being positioned for engagement with said thrust member and means for moving said throw-out lever portion into and out of engagement with said thrust member.

11. The structure of claim 10 further characterized in that the means for moving said throw-out lever includes a cam member.

12. The structure of claim 1 further characterized in that said lead screw is attached to said spindle, said clutch member being positioned for driving engagement with said nut, and means for rotating said clutch member.

13. The structure of claim 12 further characterized in that said clutch member includes a coil spring.

14. The structure of claim 13 further characterized in that said coil spring is at least in part wound about the exterior of said nut.

15. The structure of claim 1 further characterized in that said nut is attached to said spindle, said clutch member being positioned for driving engagement with said lead screw and means driven by said nut for rotating said clutch member.

16. The structure of claim 15 further characterized by and including speed control means connected between said clutch member and said nut for controlling the rotational speed of said clutch member.

* * * * *